United States Patent [19]
Grube et al.

[11] Patent Number: 5,377,193
[45] Date of Patent: Dec. 27, 1994

[54] TRUNKING SYSTEM ACCESS METHOD

[75] Inventors: Gary W. Grube, Palatine; Alan I. Wilson, Hoffman Estates; Daniel J. McDonald, Cary, all of Ill.

[73] Assignee: Motorola, Inc., Schaumburg, Ill.

[21] Appl. No.: 876,547

[22] Filed: Apr. 30, 1992

[51] Int. Cl.$^5$ .............................................. H04J 3/16
[52] U.S. Cl. ................................. 370/95.1; 370/85.7; 370/110.1
[58] Field of Search .................... 370/95.1, 95.3, 85.7, 370/110.1; 340/825.03, 825.04; 455/33.1, 33.2, 33.3, 34.1, 34.2

[56] References Cited

U.S. PATENT DOCUMENTS

| | | | |
|---|---|---|---|
| 4,850,033 | 7/1989 | Eizenhofer et al. | 455/34.1 |
| 4,870,408 | 9/1989 | Zdunek et al. | 455/34.1 |
| 4,942,570 | 7/1990 | Kotzin et al. | 370/68.1 |

Primary Examiner—Douglas W. Olms
Assistant Examiner—Ajit Patel
Attorney, Agent, or Firm—Timothy W. Markison

[57] ABSTRACT

In a communication system, the following describes a method for the communication system to more efficiently process control information when the control channel is temporarily used as a voice channel. When a communication unit has control information to transmit to the communication resource allocator, it determines whether the monitored voice channel is busy. When the monitored voice channel is not busy, the communication unit transmits the control information to the communication resource allocator on the monitored voice channel. Regardless of whether the monitored voice channel is busy or not, the communication resource allocator transmits recommended channel parameters on the monitored channel wherein the recommended channel parameters comprises at least one recommended channel. When the monitored voice channel is busy, the communication unit decodes the recommended channel parameters to ascertain the at least one recommended channel. Having done this, the communication unit determines whether the at least one recommended channel is usable, and when the recommended channel is usable, the communication unit transmits its control information on that channel to the communication resource allocator.

14 Claims, 2 Drawing Sheets

TRUNKING SYSTEM ACCESS METHOD

FIELD OF THE INVENTION

This invention relates generally to communication systems and in particular to a method that allows communication units to transmit control information when all the communication resources are being used as voice channels.

BACKGROUND OF THE INVENTION

Trunking communication systems are known to comprise a plurality of communication units arranged into a predetermined number of communication groups, a limited number of communication resources that are transceived via a predetermined number of repeaters, and a communication resource allocator that allocates the limited number of communication resources among the plurality of communication units. The communication resource may be a time division multiplex (TDM) slot(s), a frequency carrier, a pair of frequency carriers, or any other radio frequency (RF) transmission means. Of the communication resources, one is typically selected as a control channel while the remaining communication resources act as voice channels. The control channel transceives outbound signalling words (OSW) from the communication resource allocator to the communication units and also inbound signalling words (ISW) from the communication units to the communication resource allocator. OSWs and ISWs are data which indicate system operations to be performed or system features that are desired to be accessed by the communication units. For example, when a communication unit desires to transmit a message to another communication unit, it transmits an ISW to the communication resource allocator requesting access to a communication resource and identifies the target communication unit. If the communication resource allocator grants the communication units request, it transmits the OSW to the communication unit indicating to both the initiating communication unit and the target communication unit which communication resource the conversation will take place on.

At times, the communication resource allocator will not grant the communication unit's request for a communication resource primarily due to an overloading of the system, i.e. all of the communication resources are allocated and there are several requests waiting to be granted. Under such conditions, the communication resource allocator, which typically includes a queue to store the request that cannot be granted upon receipt, is saturated and cannot handle, for that moment, another request for a communication resource. To handle this overload condition, a prior art system may temporarily use the control channel as a voice channel thus increasing the number of voice channels which in turn reduces the communication resource request backlog. When the control channel is acting as a voice channel, the communication resource allocator cannot receive ISWs or transmit OSWs which leaves communication units that are not presently in a communication or the communication resource request queue temporarily incapable of communicating with the communication resource allocator. This presents a serious problem when a communication unit needs to immediately communicate with the communication resource allocator, for example, when the unit has an emergency condition.

One approach to overcome this problem is to select one of the communication resources to act as a voice/control channel when the actual control channel is being used as a voice channel. In such a system, the communication units may transmit a select number of control functions to the communication resource allocator via the control/voice channel. The control information is transmitted in a low frequency signalling manner, i.e. frequency below 300 hertz. This overcomes the problem of communication units not being able to access the communication system when the control channel is being used as a voice, however, this approach limits the access to a select number of control functions that can be executed. Therefore, a need exists for a method that allows communication units to transmit any control information to the communication resource allocator when the control channel is being used as a voice channel.

SUMMARY OF THE INVENTION

These needs and others are substantially met by the trunking system access method disclosed herein. In a trunking communication system that comprises a plurality of communication units, a limited number of communication resources that are transceived via a predetermined number of repeaters, and a communication resource allocator that allocates the limited number of communication resources among the plurality of communication units, wherein one of the communication resources functions as a control channel and the remaining communication resources function as voice channels, wherein, from time to time, the control channel is used as a voice, and, when the control channel is used as a voice channel, the plurality of communication units monitor a voice channel as a monitored voice channel, the following discloses a method that allows the communication system to more efficiently process control information during this time. When a communication unit has control information to transmit to the communication resource allocator, the communication resource allocator determines whether the monitored voice channel is busy. When the monitored voice channel is not busy, the communication unit transmits the control information on the monitored voice channel. Regardless of whether the monitored voice is busy or not, the communication resource allocator transmits recommended channel parameters on the monitored voice channel, wherein the recommended channel parameters comprises at least one recommended channel. When the monitored voice channel is busy, the communication unit decodes the recommended channel parameters to ascertain the at least one recommended channel. Having done this, the communication unit determines whether the at least one recommended channel is usable, and when the channel is usable, transmitting the control information on the recommended channel.

DESCRIPTION OF A PREFERRED EMBODIMENT

Generally, the present invention provides a method for control information to be transmitted by all communication units in a communication system when the system does not have a control channel. The communication resource allocator determines a recommended channel which is transmitted to all communication units to facilitate control information processing. The communication units use the recommended channel information to determine which, if any, voice channels can be used to transmit control information. With this approach, most, if not all, control information requests can be processed.

Figure 1:
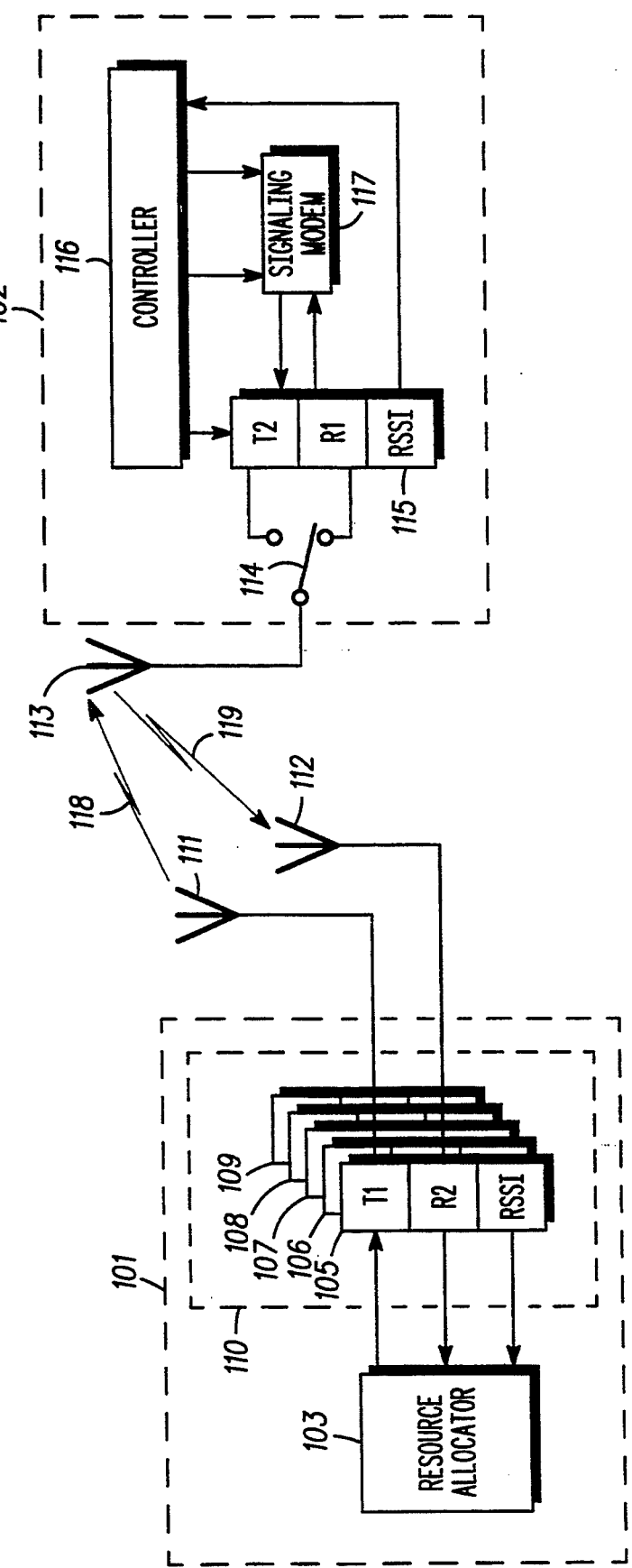
FIG. 1 illustrates a communication system that may incorporate the present invention.

The present invention can be more fully described with reference to FIGS. 1-3. FIG. 1 illustrates a trunked radio system 101, and a communication unit 102, in accordance with the present invention. The trunked radio system 101 comprises a communication resource allocator 103, a limited number of communication resources 105-109, a receive antenna 111 and a transmit antenna 112 used to communicate with the communication units. The communication unit 102, such as a Motorola STX trunked radio, comprises an antenna 113, an antenna switch 114, a transceiver 115 which may contain an RSSI detector device, a controller 116, such as a Motorola 68HC11, and a signaling modem 117. The controller 116 is operably coupled to the transceiver 115 to provide control of the transceiver. Signaling modem 117 translates control signaling, relayed by the transceiver 115, to and from the trunked radio system 101, into information usable by the controller. The communication unit 102 receives control information 118 from the trunked communication system and transmits control information 119 to the trunked communication system in order to perform communications on the system.

Figure 2:
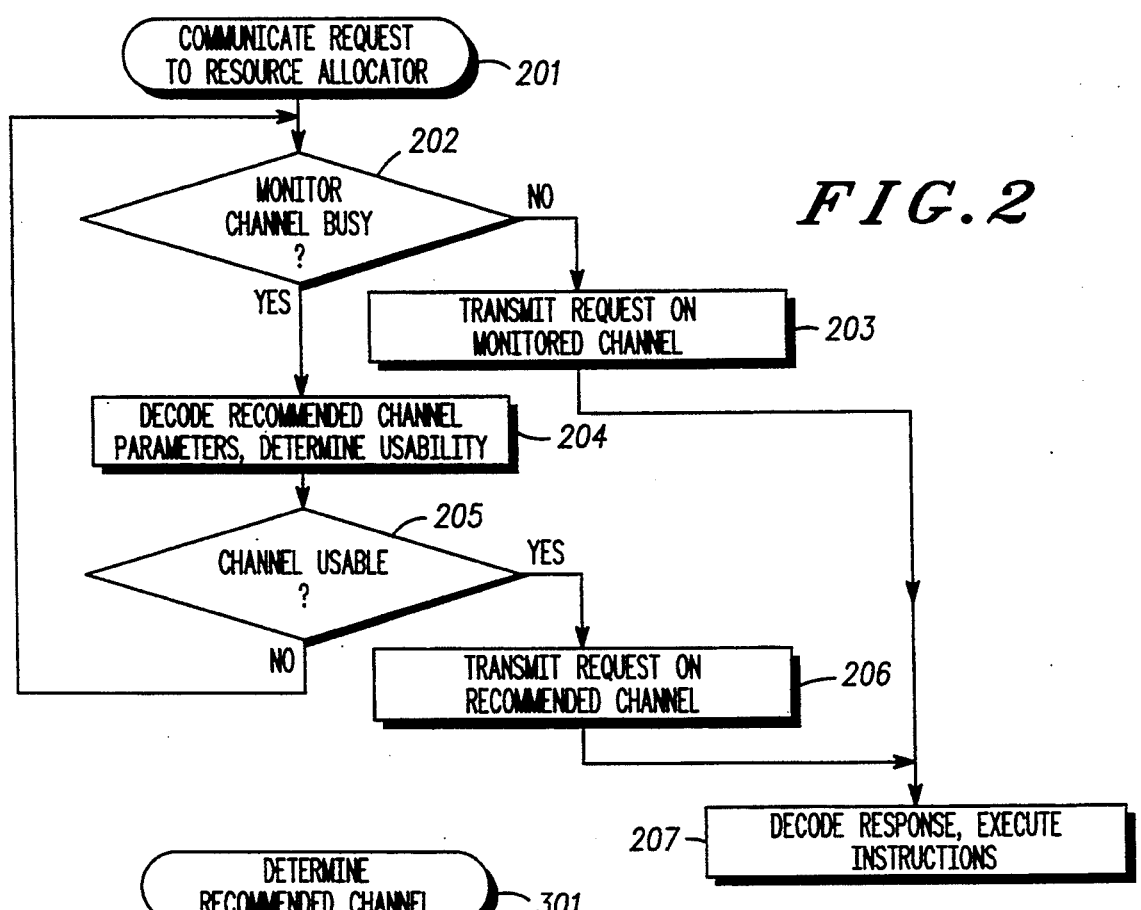
FIG. 2 illustrates a logic diagram for a communication unit to implement the present invention.

FIG. 2 illustrates a logic implementation of the present invention that is incorporated into a communication unit 102. The algorithm is installed and uses existing memory and microprocessing in most communication units, however, some communication units may require additional memory and/or microprocessing. At step 201, a communication unit 102 wishes to issue control information, or a communication request, to the resource allocator 103. At step 202, the communication unit 102 determines if the currently monitored voice channel is busy. A voice channel is considered busy if the inbound frequency of the voice channel is currently being used by another communication unit. The communication unit 102 can determine if the currently monitored channel is busy based on control information issued, on the monitored voice channel, by the resource allocator 103. The control information issued by the resource allocator 103 to indicate that the monitored channel is busy could take the form of several signals. Two examples of control information that indicate that the monitored voice channel is busy would be the use of busy bits to indicate that the inbound frequency of the channel is busy (i.e. if the busy bit is set, the channel is busy). A second method would be to use a Receive Signal Strength Indicator (RSSI) value of the inbound frequency. If the RSSI value was greater than a predetermined value, the inbound frequency would be considered busy.

If, at step 202, the communication unit 102 determines that the monitored voice channel is not busy, processing will continue at step 203 where the communication unit 102 transmits its control information on the monitored channel. After the control information has been issued, the communication unit 102 must obtain a response from the resource allocator 103. Processing continues at step 207 where the communication unit 102 decodes the response from the resource allocator 103 and executes the resource allocator's instructions. In practice, the response from the resource allocator 103 to the request made from the communication unit 102 will occur on the voice channel that the control information was received on (i.e. monitored channel).

If, at step 202, the monitored voice channel was busy, processing would continue to step 204. At step 204, the communication unit 102 decodes the recommended channel parameters issued by the resource allocator 103 to determine if the recommended channel is usable by the communication unit 102. The recommended channel parameters would contain such information as the recommended channel number, the effective radiated power of a transmitter (ERPo) of the recommended channel and the receiver signal strength (USER-RSSIo) of a current user of the inbound frequency of the recommended channel. In addition to receiving these parameters, the communication unit measures its own signal strength of received outbound signals (RSSIo). The RSSIo is calibrated for power level received at the communication unit's antenna (i.e. it is already calibrated to account for communication unit 102 antenna gain, feedline losses, and sensitivity of receiver). By using these transmitted parameters and the RSSIo, the communication unit 102 can determine if the recommended channel is usable for sending control information to the resource allocator 103.

It is necessary for the communication unit 102 to predict the receive signal strength of its inbound control information (RSSIi) transmitted to the communication channel. In order to determine the RSSIi, the outbound path loss (PLo) must be calculated. The PLo is determined by the following formula:

$$PL_o = ERP_o - RSSI_o.$$

Assuming the outbound path loss, PLo, is equal to the inbound path loss, PLi, and the fact that the communication unit can determine the effective radiated power of the mobile, ERPi (based on actual transmit power, antenna gain and line loss), the communication unit can now predict the inbound receive signal strength (RSSIi):

$$RSSI_i = ERP_i - PL_i.$$

At step 205, the communication unit 102 determines whether the recommended channel is usable by comparing the RSSIi to the USER-RSSIo and if the RSSIi is greater than the USER-RSSIo by a predetermined threshold value (i.e.. Mdb), then the recommended channel is considered usable. If the channel is usable, processing continues at step 206 where the communication unit 102 transmits its control information request on the recommended channel. After the control information has been issued, the communication unit must obtain a response from the resource allocator 103. Processing continues at step 207 where the communication unit 102 decodes the response from the resource allocator and executes the resource allocator's 103 instructions. In practice, the response from the resource allocator 103 to the request made from the communication unit 102 will occur on the voice channel that the control information was received on (i.e. recommended channel). If, at step 205, the recommended channel is usable, processing continues at step 202.

Figure 3:
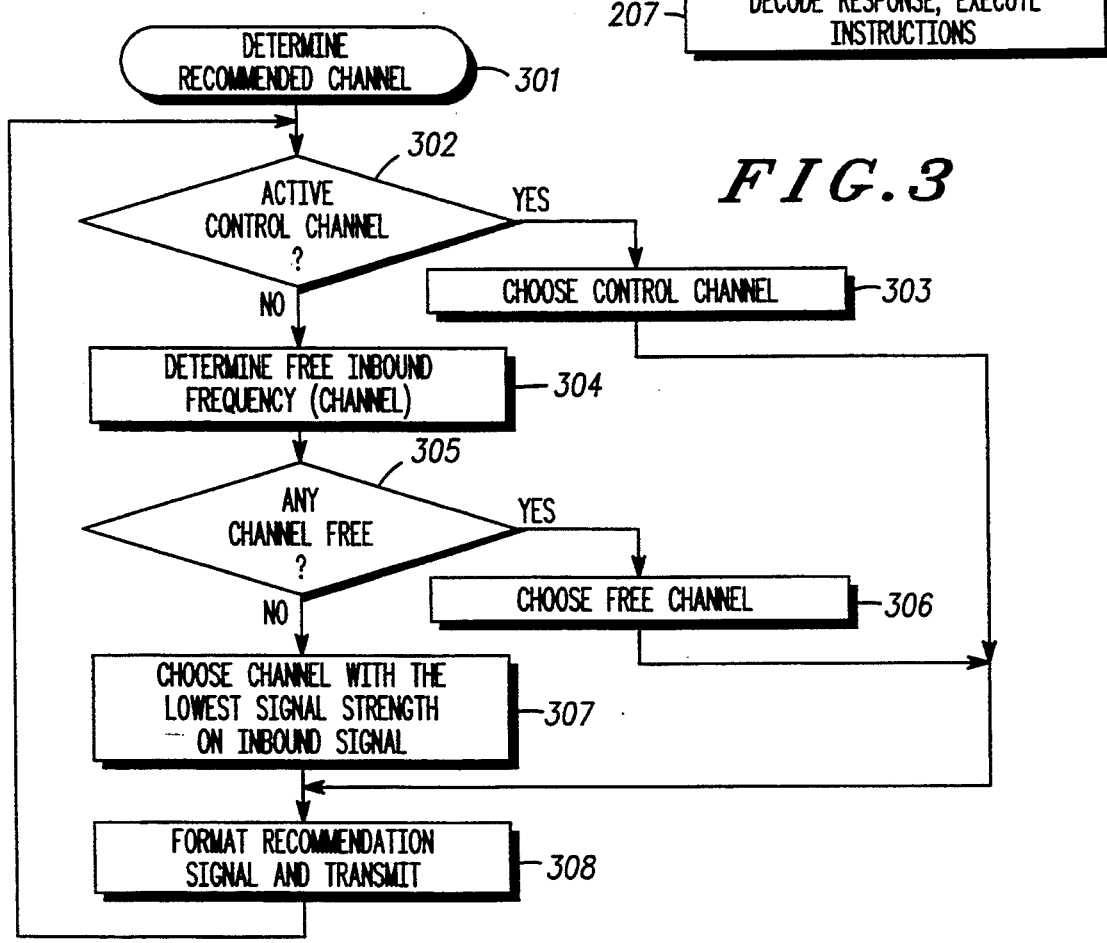
FIG. 3 illustrates a logic diagram that the communication resource allocator may use to implement the present invention.

FIG. 3 illustrates a logic diagram of the present invention that is incorporated into the communication resource allocator 103. The algorithm is installed and uses existing memory and microprocessing in the resource allocator 103, however, some resource allocators 103 may require additional memory and/or microprocessing. At step 301, the resource allocator 103 begins the determination of the recommended channel for inbound control information from the communication units.

At step 302, if there is a control channel active on the system, the control channel will be chosen as the recommended channel 303. Once a recommended channel is chosen, processing continues at step 308. The control channel is the most effective mechanism for transmitting control information on a trunked system and is therefore, the best choice for receiving inbound control information. If, at step 302, there is not a control channel active on the system, processing continues at step 304.

At step 304, the resource allocator 103 determines whether there are any free (non busy) inbound frequencies. A free inbound frequency could be a channel used only for an outbound transmission, such as when a wireline dispatcher makes a transmission or if a channel is transmitting its base station identification. Another case in which the inbound frequency is not busy would be during the hang time of a communication. If, at step 305, the resource allocator 103 determines that there is a channel that is not busy, processing continues to step 306 where the non busy channel is chosen as the recommended channel. Once a recommended channel is chosen, processing continues at step 308.

If, at step 305, a free (non busy) channel is not found, processing continues to step 307. At step 307, the resource allocator 103 will choose the voice channel with the lowest receive signal strength (RSSI) of the inbound signal. The RSSI for each communication channel is determined by the RSSI detector on each communication channel. Once a recommended channel is chosen, processing continues at step 308.

At step 308, the resource allocator 103 formats the recommended channel information (channel number, USER-RSSI, and ERPo) and transmits this information to the communication units 102. In practice, the recommended channel information will transmitted on all voice channels. Once the recommended channel information is transmitted, processing continues at step 302 where the recommended channel is reevaluated.

This invention allows control information to be efficiently processed when the communication system does not have a control channel. By informing the communication units of a recommended channel for issuing inbound control information and empowering the communication units to determine if their inbound signal can be received by the resource allocator, inbound control information issued by communication units is handled more efficiently than prior art system which did not provide recommended channel information and merely had the radio attempt to transmit on its monitored channel without any knowledge as to whether the inbound control signal would be received by the resource allocator.

We claim:

1. In a trunking communication system that comprises a plurality of communication units, a limited number of communication resources that are transceived via a predetermined number of repeaters, and a communication resource allocator that allocates the limited number of communication resources among the plurality of communication units, wherein one of the communication resources functions as a control channel and the remaining communication resources function as voice channels, wherein, from time to time, the control channel is used as a voice channel, and, when the control channel is used as a voice channel, the plurality of communication units monitor one of the voice channels as a monitored voice channel, a method for the communication system to process control information in an efficient manner, the method comprises the steps of:

a) when a communication unit has control information to transmit to the communication resource allocator, determining whether the monitored voice channel is busy;

b) when the monitored voice channel is not busy, transmitting, by the communication unit, the control information on the monitored voice channel;

c) transmitting, by the communication resource allocator, recommended channel parameters on at least the monitored voice channel, wherein the recommended channel parameters comprise at least one recommended channel;

d) when the monitored voice channel is busy, decoding, by the communication unit, the recommended channel parameters to ascertain said at least one recommended channel;

e) determining, by the communication unit, whether said at least one recommended channel is usable; and f) when the recommended channel is usable, transmitting, by the communication unit, the control information on said at least one recommended channel.

2. In the method of claim 1, the determination of step (a) further comprises decoding a channel busy indicator of the monitored voice channel, wherein the channel busy indicator is transmitted by the communication resource allocator and indicates whether an inbound frequency of the monitored voice channel is busy.

3. In the method of claim 1, the transmission of recommended channel parameters of step (c) further comprises transmitting, as part of the recommended channel parameters, effective radiated power of a transmitter of the recommended channel.

4. In the method of claim 3, the transmission of recommended channel parameters of step (c) further comprises transmitting, as part of the recommended channel parameters, receiver signal strength of a current user of the inbound frequency of the recommended channel.

5. In the method of claim 4, the transmission of recommended channel parameters of step (c) further comprises transmitting, as part of the recommended channel parameters, a channel busy indicator of the recommended channel, wherein the channel busy indicator is transmitted by the communication resource allocator and indicates whether an inbound frequency of the recommended channel is busy.

6. In the method of claim 5, the determination of step (e) further comprises decoding the channel busy indicator to determine whether the inbound frequency of the recommended channel is busy such that when the inbound frequency of the recommended channel is not busy the recommended channel is usable.

7. The method of claim 6 further comprises, when the inbound frequency of the recommended channel is busy, comparing the receiver signal strength of the current user of the inbound frequency of the recommended channel with predicted signal strength of the communication unit; and when the predicted signal strength of the communication unit is a predetermined value greater than the receiver signal strength of the current user of the inbound frequency of the recommended channel, determining that the recommended channel is usable.

8. In a trunking communication system that comprises a plurality of communication units, a limited number of communication resources that are transceived via a predetermined number of repeaters, and a communication resource allocator that allocates the limited number of communication resources among the plurality of communication units, wherein one of the communication resources functions as a control channel and the remaining communication resources function as voice channels, wherein, from time to time, the control channel is used as a voice channel, and, when the control channel is used as a voice channel, the plurality of communication units monitor one of the voice channels as a monitored voice channel, a method for a communication unit to have its control information processed in an efficient manner, the method comprises the steps of:

a) when the communication unit has control information to transmit to the communication resource allocator, determining whether the monitored voice channel is busy;

b) when the monitored voice channel is not busy, transmitting the control information on the monitored voice channel;

c) receiving recommended channel parameters on at least the monitored voice channel, wherein the recommended channel parameters comprise at least one recommended channel;

d) when the monitored voice channel is busy, decoding the recommended channel parameters to ascertain said at least one recommended channel;

e) determining whether said at least one recommended channel is usable; and f) when the recommended channel is usable, transmitting the control information on said at least one recommended channel.

9. In the method of claim 8, the determination of step (a) further comprises decoding a channel busy indicator of the monitored voice channel, wherein the channel busy indicator is received from the communication resource allocator and indicates whether an inbound frequency of the monitored voice channel is busy.

10. In the method of claim 8, the receiving of recommended channel parameters of step (c) further comprises receiving, as part of the recommended channel parameters, effective radiated power of a transmitter of the recommended channel.

11. In the method of claim 10, the receiving of recommended channel parameters of step (c) further comprises receiving, as part of the recommended channel parameters, receiver signal strength of a current user of the inbound frequency of the recommended channel.

12. In the method of claim 11, the receiving of recommended channel parameters of step (c) further comprises receiving, as part of the recommended channel parameters, a channel busy indicator of the recommended channel, wherein the channel busy indicator is received from the communication resource allocator and indicates whether an inbound frequency of the recommended channel is busy.

13. In the method of claim 12, the determination of step (e) further comprises decoding the channel busy indicator to determine whether the inbound frequency of the recommended channel is busy such that when the inbound frequency of the recommended channel is not busy the recommended channel is usable.

14. The method of claim 13 further comprises, when the inbound frequency of the recommended channel is busy, comparing the receiver signal strength of the current user of the inbound frequency of the recommended channel with predicted signal strength of the communication unit; and when the predicted signal strength of the communication unit is a predetermined value greater than the receiver signal strength of the current user of the inbound frequency of the recommended channel, determining that the recommended channel is usable.

* * * * *